(12) United States Patent
Sun

(10) Patent No.: US 9,348,064 B2
(45) Date of Patent: May 24, 2016

(54) PLASTIC LENS, METHOD FOR MANUFACTURING THE SAME, AND IMAGING DEVICE USING THE SAME

(71) Applicant: PANASONIC CORPORATION, Osaka (JP)

(72) Inventor: Yihong Sun, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 98 days.

(21) Appl. No.: 13/783,834

(22) Filed: Mar. 4, 2013

(65) Prior Publication Data

US 2013/0176633 A1 Jul. 11, 2013

Related U.S. Application Data

(63) Continuation of application No. PCT/JP2011/006715, filed on Nov. 30, 2011.

(30) Foreign Application Priority Data

Mar. 22, 2011 (JP) ................. 2011-063070

(51) Int. Cl.
*G02B 7/02* (2006.01)
*G02B 3/00* (2006.01)
(Continued)

(52) U.S. Cl.
CPC ............ *G02B 3/00* (2013.01); *B29D 11/00432* (2013.01); *G02B 7/02* (2013.01); *G02B 7/022* (2013.01); *G02B 13/004* (2013.01); *B29C 45/0053* (2013.01); *B29C 2045/0058* (2013.01)

(58) Field of Classification Search
CPC ........ G02B 7/02; G02B 7/022; G02B 13/004; G02B 3/00; B29D 11/00432; B29C 45/0053; B29C 2045/0058
USPC ......... 359/811, 808, 819, 820, 642; 264/1.32, 264/1.26, 2.6, 453, 478, 328.9
See application file for complete search history.

(56) References Cited

U.S. PATENT DOCUMENTS 5,982,565 A * 11/1999 Nomura .............. B29C 45/0025
264/2.2
6,008,955 A * 12/1999 Nomura et al. ............... 359/719
(Continued)

FOREIGN PATENT DOCUMENTS

JP 55-041434 A 3/1980
JP 56-066814 A 6/1981
(Continued)

OTHER PUBLICATIONS

International Search Report issued in International Patent Application No. PCT/JP2011/006715 mailed on Feb. 21, 2012.
(Continued)

*Primary Examiner* — Ricky Mack
*Assistant Examiner* — Mustak Choudhury
(74) *Attorney, Agent, or Firm* — McDermott Will & Emery LLP

(57) ABSTRACT

A plastic lens 1 has a lens 2 that effectively functions as a lens at a center and an annular flange 3 that does not act as a lens along a circumference of the lens. A gate 4 serving as a flow channel through which molten plastic is to be poured during molding is formed on a circumference of the flange. The gate is cut and taken away at an angle of inclination so as to include a point of intersection between the gate 4 and the circumferential flange 3, whereby a circumferential flange having a given thickness or more is formed.

7 Claims, 10 Drawing Sheets

(51) Int. Cl.
  *G02B 13/00* (2006.01)
  *B29D 11/00* (2006.01)
  *B29C 45/00* (2006.01)

(56) References Cited

U.S. PATENT DOCUMENTS

| | | | |
|---|---|---|---|
| 6,008,957 | A | 12/1999 | Nomura et al. |
| 6,144,500 | A | 11/2000 | Iwaki et al. |
| 6,219,191 | B1 | 4/2001 | Iwaki et al. |
| 7,286,307 | B2 * | 10/2007 | Yamamoto ............ B29C 65/168 359/811 |
| 2001/0007513 | A1 * | 7/2001 | Koshimizu .......... B29C 45/0055 359/811 |
| 2004/0252383 | A1 | 12/2004 | Hamada |
| 2005/0243443 | A1 * | 11/2005 | Yamamoto ............ B29C 65/168 359/819 |
| 2008/0218882 | A1 * | 9/2008 | Takase .................. G02B 7/021 359/822 |
| 2009/0086039 | A1 * | 4/2009 | Goto ..................... G02B 7/025 348/208.11 |
| 2009/0213476 | A1 * | 8/2009 | Takumi ................... G02B 3/00 359/796 |

FOREIGN PATENT DOCUMENTS

| | | |
|---|---|---|
| JP | 05-220794 B2 | 8/1993 |
| JP | 10-274703 A | 10/1998 |
| JP | 11-109106 A | 4/1999 |
| JP | 11-202106 A | 7/1999 |
| JP | 2001-018263 A | 1/2001 |
| JP | 2003-114368 A | 4/2003 |
| JP | 2003-121716 A | 4/2003 |
| JP | 2007-212744 A | 8/2007 |
| JP | 2007-331311 A | 12/2007 |
| JP | 2009-244594 A | 10/2009 |
| JP | 2009-265473 A | 11/2009 |

OTHER PUBLICATIONS

Extended European Search Report issued in corresponding European Patent Application No. 11861459.3, mailed on Dctober 28, 2015.

* cited by examiner (a)

(b)

(c)

(d)

(a) (b)

(a) (b)

PLASTIC LENS, METHOD FOR MANUFACTURING THE SAME, AND IMAGING DEVICE USING THE SAME

RELATED APPLICATIONS

This application is the U.S. National Phase under 35 U.S.C. §371 of International Application No. PCT/JP2011/006715, filed on Nov. 30, 2011, which in turn claims the benefit of Japanese Application No. 2011-063070, filed on Mar. 22, 2011, the disclosures of which Applications are incorporated by reference herein.

BACKGROUND OF THE INVENTION

1. Field of the invention

The present invention relates to a plastic lens, a method for manufacturing the lens, and an imaging device using the lens and, more particularly, an imaging system lens employed in a vehicle-mounted camera, a monitoring camera, an underwater camera, and the like.

2. Description of the related art

A glass lens has hitherto been used as a first surface lens to be fitted to the outermost surface of a vehicle-mounted camera. A common method employed in fixing a glass lens (a lens 10) is a so-called thermal caulking technique for thermally softening a portion of a lens holder and holding a lens tight in the holder. FIGS. 10(a) to 10(c) are drawings showing processes of thermal caulking. FIG. 10(a) shows a state achieved before thermal caulking; FIG. 10(b) shows a state achieved in the course of thermal caulking; and FIG. 10(c) shows a state achieved after thermal caulking.

As shown in FIG. 10(a), an annular thermal caulking portion 12 is provided in a lens holder 11 formed from a thermoplastic resin. The lens 10 is fitted into the thermal caulking portion 12, and a thermal caulking press member 20 is subsequently heated. The thermal caulking press member 20 is attached to the thermal caulking portion 12 from above and comes under predetermined pressure, whereupon, as shown in FIG. 10(c), an edge of the thermal caulking portion 12 covers an upper portion of the lens 10. Caulking is thus completed.

In the lens 10 having a flange 3 that is continual over an entire circumference, the thermal caulking portion 12 of the lens holder 11 can cover the circumference of the flange 3 of the lens 10 with no space therebetween. Accordingly, the thermal caulking portion 12 can evenly bear load, and given lens anchorage strength or more can be readily fulfilled.

In the meantime, another proposed lens 10 has the flange 3 that is partially cut rather than being formed continuously along the entire circumference of the lens 10. As shown in FIGS. 11(a) and 11(b), a D-cut shape resulting from partial chipping of the flange 3 is also proposed for the lens 10 that does not have the continuous flange 3. However, the configuration includes clearance between the thermal caulking portion 12 of the lens holder 11 and the flange 3 of the lens 10. Hence, the circumference of the lens cannot evenly bear load, so that sufficient lens anchorage strength cannot be obtained.

When the first surface lens of the vehicle-mounted camera is replaced with a plastic lens as a substitute for a glass lens for reasons mentioned above, it is preferable that a circumference of the plastic lens be provided with a circumferential flange 3 which is of a given thickness or more.

Incidentally, in relation to a plastic lens formed by means of injection molding, injection compression molding, or the like, when molten plastic is injected into a cavity (a molding space) from a side, the molten plastic is left at a gate due to presence of an inlet (the gate), whereby a projecting gate is formed integrally on the circumferential flange.

As described in connection with; for instance, JP-A-11-202106, a gate 4 of the plastic lens is generally provided on the circumference of the flange 3 as shown in FIG. 12 or on a D-cut surface 6 of the flange 3 as shown in FIG. 16.

Since the gate 4 is originally unwanted, work for separating the gate 4 from the plastic lens; namely, a so-called gate cut process, is necessary. Detailed descriptions are provided to cutting of the gate by reference to FIGS. 12(a), (b), and (c).

The gate 4 provided on the circumference of the flange 3 has hitherto been cut at any point on (a root of) the gate 4 as depicted as a cut plane 5 in FIGS. 12(a), (b), and (c). Alternatively, the gate 4 is cut, while including a portion of the flange 3, along a cut plane 6 shown in FIGS. 12(a), (b), and (c). FIGS. 13(a), (b), and (c) are drawings showing an idealistic cut state of a cut made along the cut plane 6. In FIGS. 12 and 13, (a) shows front views, (b) shows a right side elevation of (a), and (c) shows rear views.

SUMMARY OF THE INVENTION

However, when the gate 4 is cut along the cut plane 5, a rib-shaped gate residue 7 is left on the flange as shown in FIGS. 14(a) and (b). The residue comes to exceed an inner diameter φD of the thermal caulking portion 12 of the lens holder 11. For this reason, the plastic lens 1 cannot be fit into the lens holder 11, nor can the plastic lens 1 and the lens holder 11 be anchored by the thermal caulking technique. FIG. 14(a) is a front view, and FIG. 14(b) is a perspective view.

In the meantime, when the gate 4 is cut along the cut plane 6, the flange 3 comes to assume a D-cut geometry as shown in FIGS. 15(a) and (b). The chip of the circumferential flange 3 brings about clearance between the plastic lens 1 and the lens holder (not shown). Accordingly, the circumference cannot evenly bear the load, so that sufficient lens anchorage strength cannot be achieved. Anchorage strength existing between the plastic lens 1 and the lens holder can be enhanced by injecting an adhesive into the clearance. However, manufacturing cost is increased as a result of addition of processes for injecting and drying an adhesive. FIG. 15(a) is a front view, and FIG. 15(b) is a perspective view.

Alternatively, there is also a case where the gate 4 provided on the D-cut plane of the flange 3 is cut along the cut plane 5 as shown in FIGS. 16(a) to (c) so as to leave a portion of the gate 4. FIGS. 16(a) and (b) are front views of the gate 4 achieved before and after cutting, and FIG. 16(c) is a perspective view of FIG. 16(b). In this case, as in the case of FIGS. 15(a) and (b), clearance occurs between the plastic lens 1 and the lens holder, so that the circumference cannot evenly bear the load. When the plastic lens 1 is anchored to the lens holder, difficulty is encountered in acquiring sufficient anchorage strength.

In order to properly maintain a lens function, cutting the gate without affecting an effective optical area that yields optical action is also a great issue.

As above, it has been difficult to produce an existing plastic lens that maintains superior an effective lens area and that does not affect its optical characteristic even after cutting of a gate formed during injection molding.

The present invention has been conceived in light of the circumstance and aims at providing a plastic lens to be produced by injection molding and that has a tubular flange with a given thickness or more even after a gate has been cut and that is well fitted to a lens holder by means of thermal caulking.

Further, the present invention aims at providing an imaging device that employs a plastic lens as a first surface lens to be fitted to an outermost surface of a vehicle-mounted camera and that exhibits a highly reliable sealing characteristic resultant from thermal caulking.

To accomplish the objectives, the present invention provides a plastic lens having a main body making up an effective optical region and an annular flange formed integrally on a circumference of the main body, wherein the flange has a tubular first circumferential surface parallel to an optical axis of the main body and a second circumferential surface including an inclined surface that obliquely cuts the flange from a first point on the first circumferential surface toward a back of the main body with respect to the direction of the optical axis and that partially has a tubular shape formed continuously from the first circumferential surface.

In the plastic lens according to the present invention, a thickness of the first circumferential surface may be one half or more of a thickness of the flange.

In the plastic lens according to the present invention, an angle of inclination θ of the inclined surface with respect to the optical axis may satisfy the following expression:

$$\theta \geq \arctan((D-d)/(H1/2)) \quad (1)$$

D: outer diameter of a flange
d: radius of main body
H1: entire length of flange in its thicknesswise direction In the plastic lens according to the present invention, the plastic lens may be manufactured by injection molding.

The present invention provides the plastic lens and includes a step of injecting a resin by way of a gate of dies and injection-molding a plastic lens having a main body making up an effective optical region, an annular flange formed integrally on an outer circumference of the main body, and a gate made up of a projection formed on a circumference of the flange from the gate of the dies and a cutting step of cutting the gate from the injection-molded plastic lens along a cut plane including a point of intersection between the gate and the flange at an angle of inclination α1≤θ≤α2. Provided that an outer diameter of the flange is taken as D; that an entire length of the flange in its thicknesswise direction is taken as H1, that a height and a width of the gate for representing a size of the gate are H2 and W, respectively, that an entire length of the flange achieved in a direction of an optical axis is taken as H3; that a point of intersection between the cut plane of the gate and the flange is taken as Q1; a point of intersection between the gate and the circumferential flange is taken as Q2 (Q2'); and that a vertical distance from a straight line passing through the points Q2 and Q2' to a line parallel to the optical axis passing through the point Q1 is taken as δ, a minimum angle of inclination α1 and a maximum angle of inclination α2 for obtaining an circumferential flange having a given thickness or more are set so as to fulfill Expressions (2), (3), (4), and (5) provided below.

[Mathematical Expression 1]

$$\alpha 1 = \arctan\left(\frac{\delta}{(H3 - H1 - H2)}\right), \quad (2)$$

$$\left(\frac{D}{2} - \delta\right)^2 + \left(\frac{W}{2}\right)^2 = \left(\frac{D}{2}\right)^2, \quad (3)$$

$$\alpha 1 = \arctan\left(\frac{D - \sqrt{D^2 - W^2}}{2 \times (H3 - H1 - H2)}\right), \text{ and} \quad (4)$$

-continued $$a2 = \arctan\left(\frac{D - d}{2 \times (H3 - H1)}\right). \quad (5)$$

The present invention provides with an imaging device comprising a first surface lens made up of the above mentioned plastic lens, a group of lenses disposed inside the first surface lens; a lens holder supporting the first surface lens and the group of lenses, and an imaging element for forming an image from entrance light passing through the first surface lens and the group of lenses.

In the present invention, the lens holder and the first surface lens may be anchored by means of thermal caulking.

In a plastic lens of the present invention, a first circumferential surface having a tubular shape parallel to an optical axis is left as a perfect circumferential surface, and a gate is obliquely cut toward an inside. Therefore, even after the gate has been cut, the lens still has a circumferential flange having a given thickness or more. A circumference of the flange exists over its entire circumference. Hence, sufficient lens anchorage strength can be obtained by thermal caulking.

Further, clearance does not exist between the lens and the lens holder, and hence intrusion of dust can be prevented.

DESCRIPTION OF THE PREFERRED EMBODIMENTS

Embodiments of the present invention are hereunder described in detail by reference to the drawings.

First Embodiment

Figure 1:
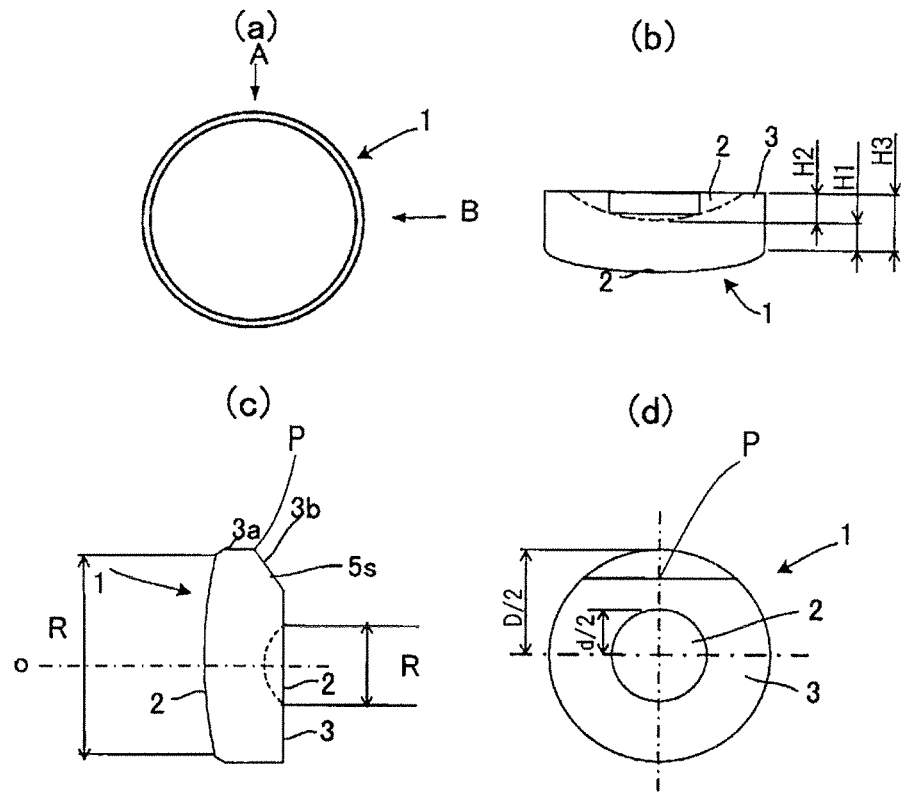
FIG. 1 is a drawing showing a plastic lens of a first embodiment of the present invention, wherein (a) is a front view, (b) is a side elevation achieved in direction A shown in (a), (c) is a side elevation achieved in direction B shown in (a), and (d) is a rear view.
Figure 2:
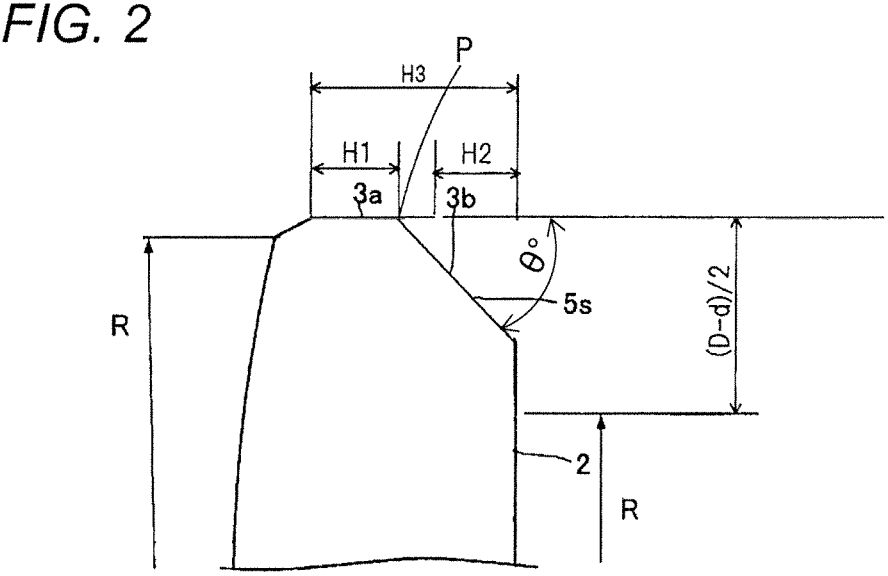
FIG. 2 is an enlarged view of a principal part shown in FIG. 1(c).
Figure 3:
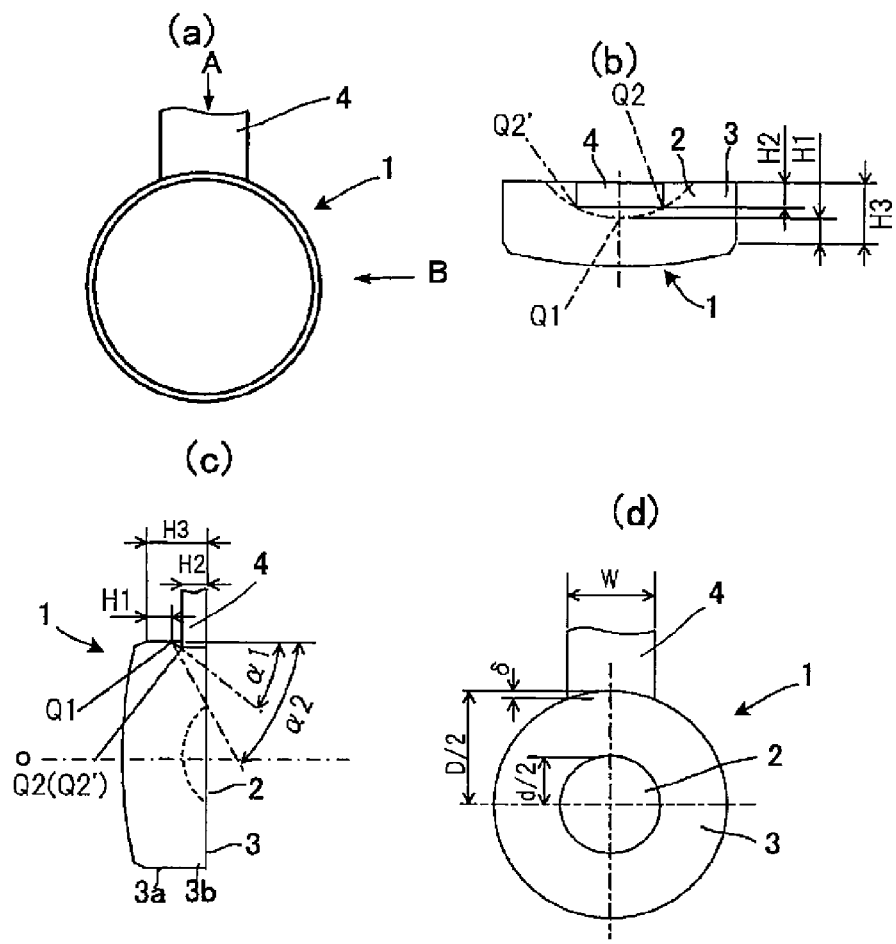
FIG. 3 are drawings showing the plastic lens of the first embodiment of the present invention achieved after injection molding and before a gate is cut, wherein (a) is a front view, (b) is a side elevation achieved in direction A shown in (a), (c) is a side elevation achieved in direction B shown in (a), and (d) is a rear view.
Figure 4:
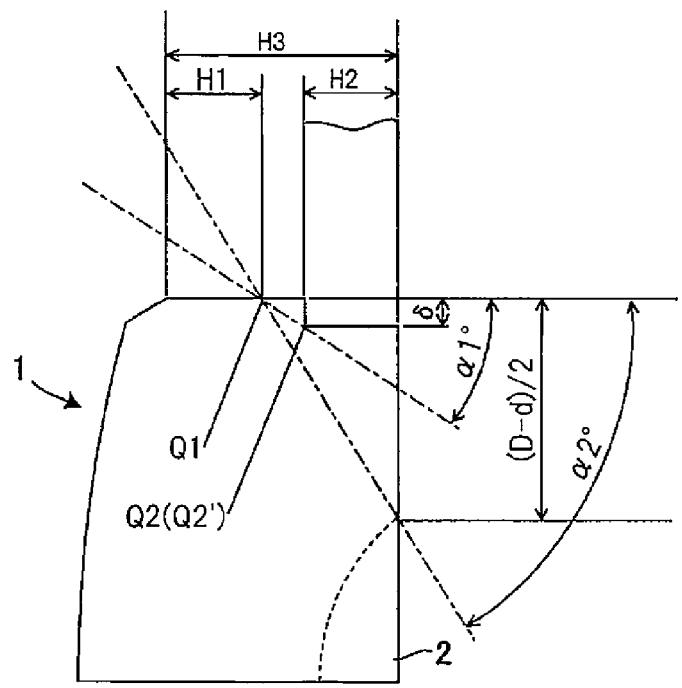
FIG. 4 is an enlarged view of a principal part shown in FIG. 3(c).
Figure 5:
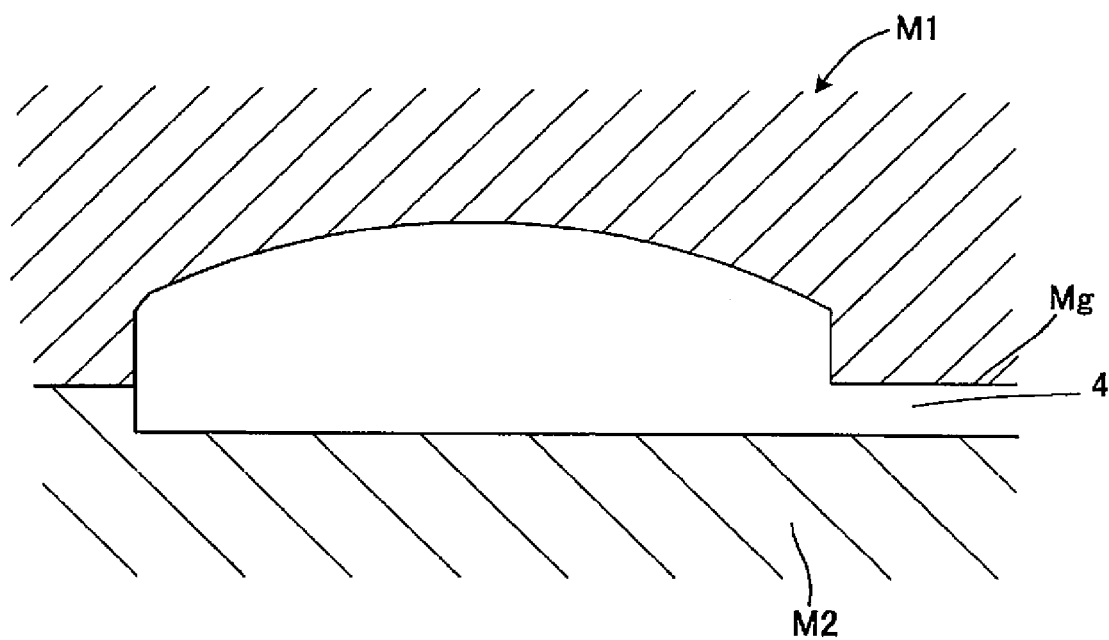
FIG. 5 is a drawing showing injection molding dies.
Figure 6:
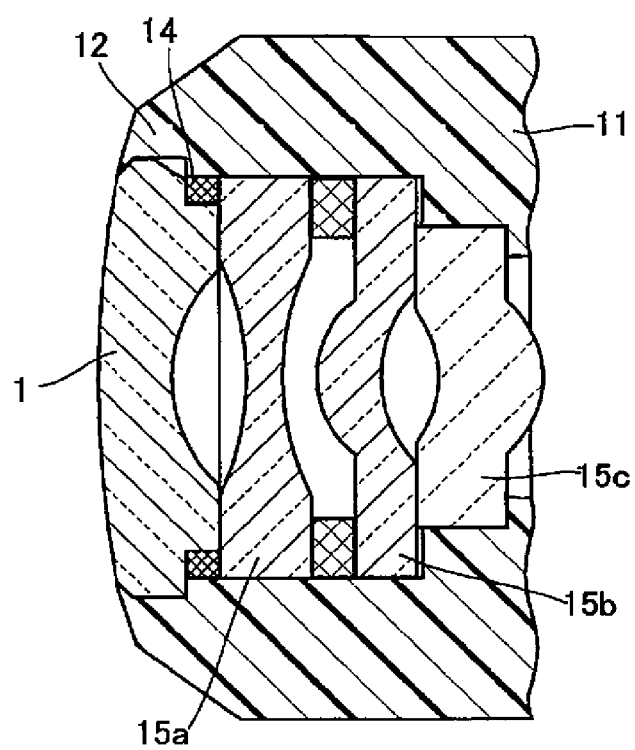
FIG. 6 is a drawing showing the plastic lens of the first embodiment of the present invention that is fitted into a lens holder.
Figure 7:
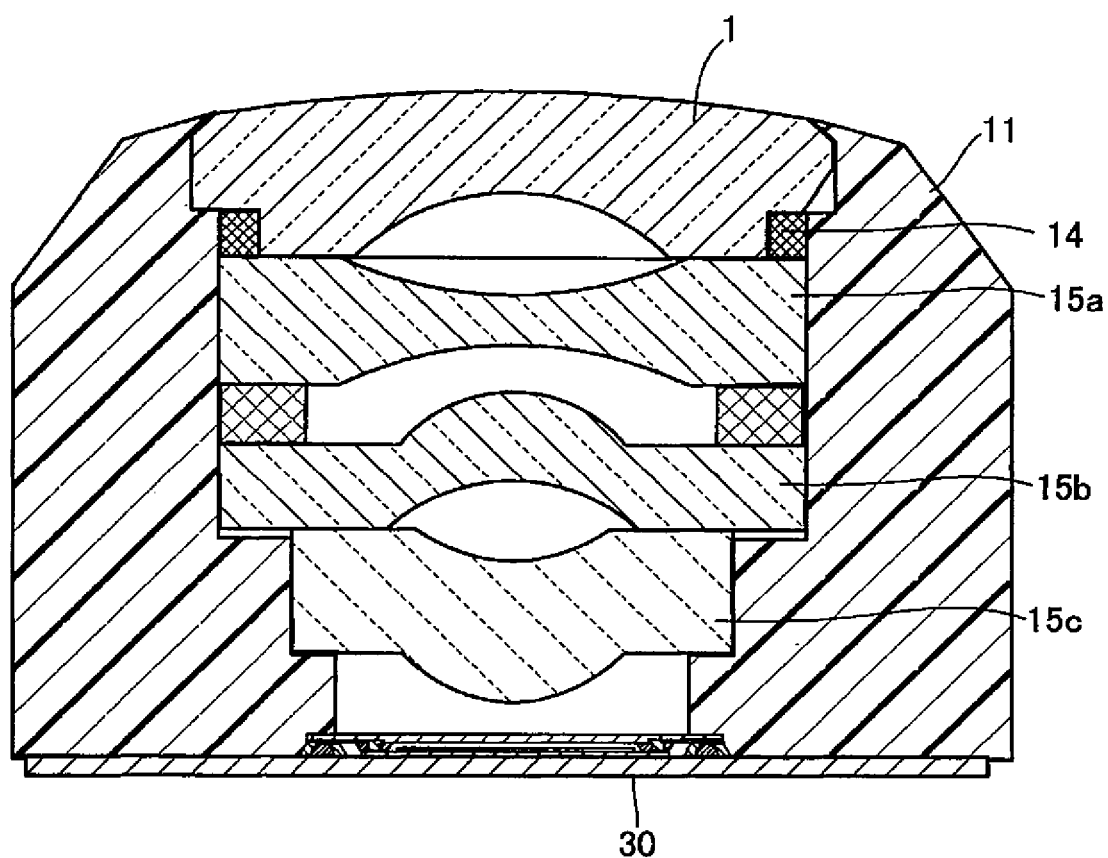
FIG. 7 is a drawing of an imaging device using the plastic lens of the first embodiment of the present invention.
Figure 8:
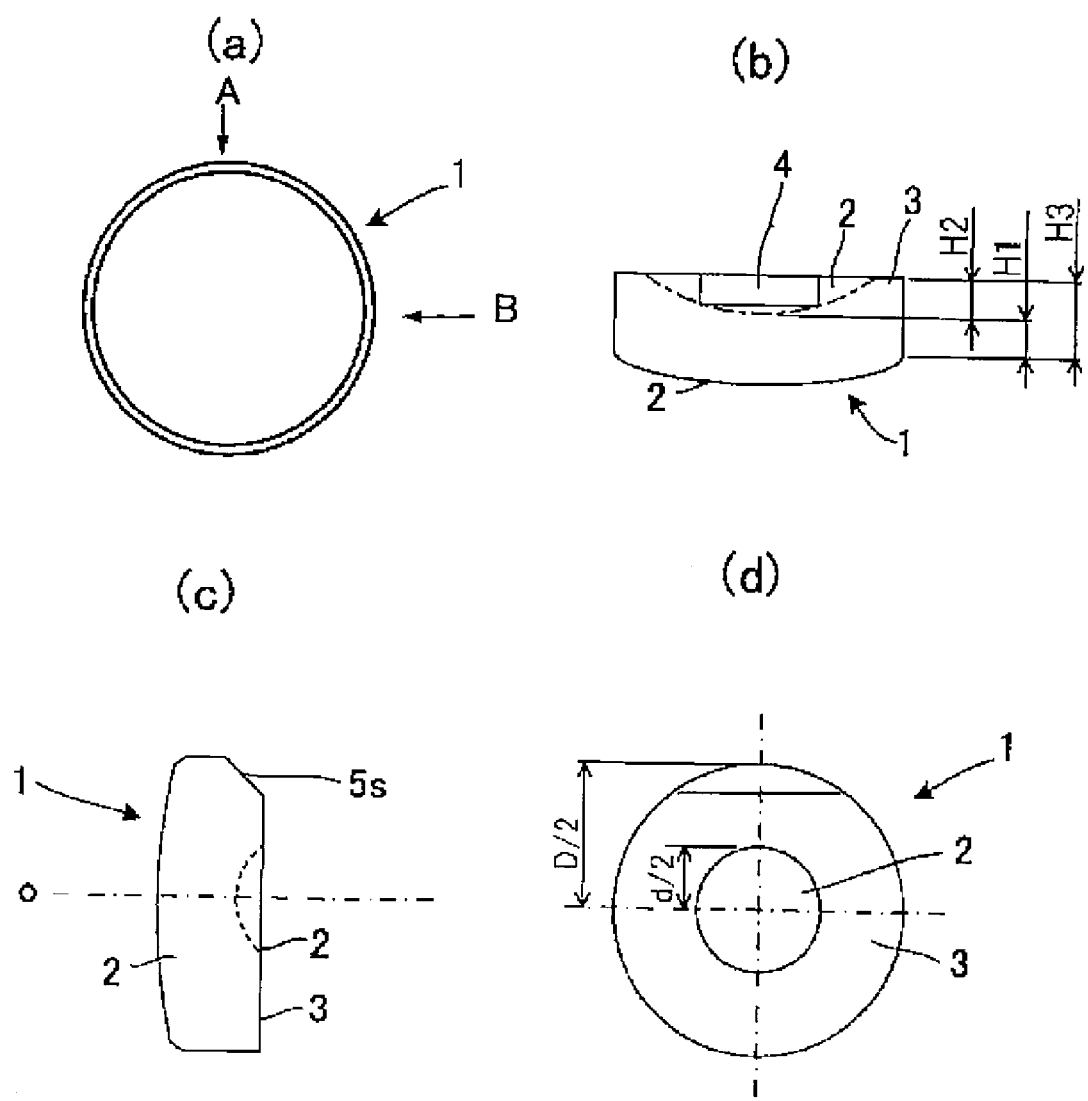
FIG. 8 are drawings showing a plastic lens of a second embodiment of the present invention, wherein (a) is a front view, (b) is a side elevation achieved in direction A shown in (a), (c) is a side elevation achieved in direction B shown in (a), and (d) is a rear view.
Figure 9:
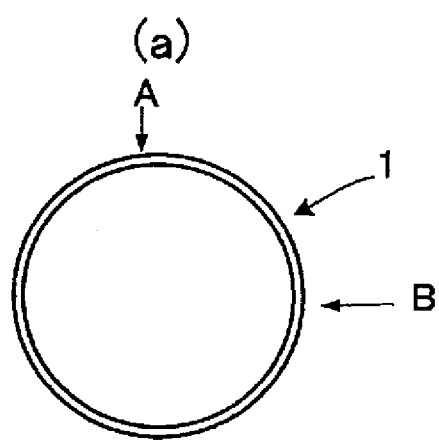
FIG. 9 are drawings showing a plastic lens of a third embodiment of the present invention, wherein (a) is a front view, (b) is a side elevation achieved in direction A shown in (a), (c) is a side elevation achieved in direction B shown in (a), and (d) is a rear view.
Figure 9:
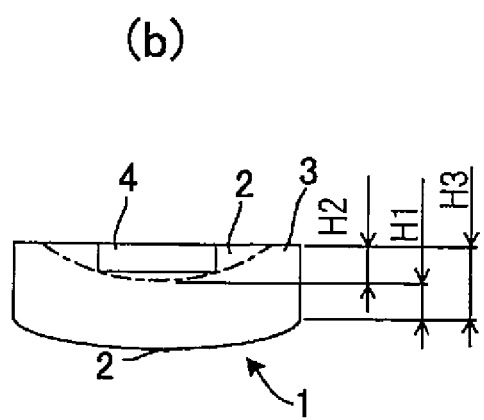
Figure 9:
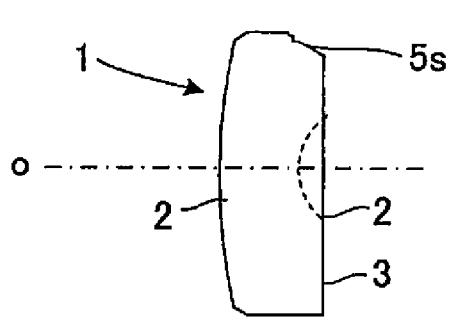
Figure 9:
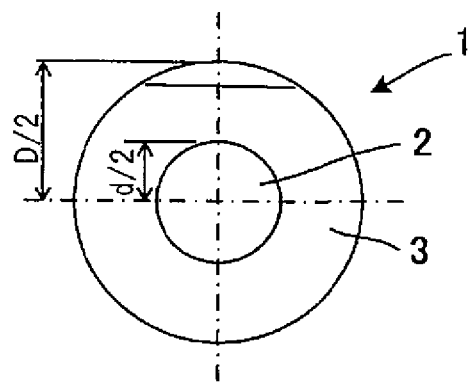
Figure 10:
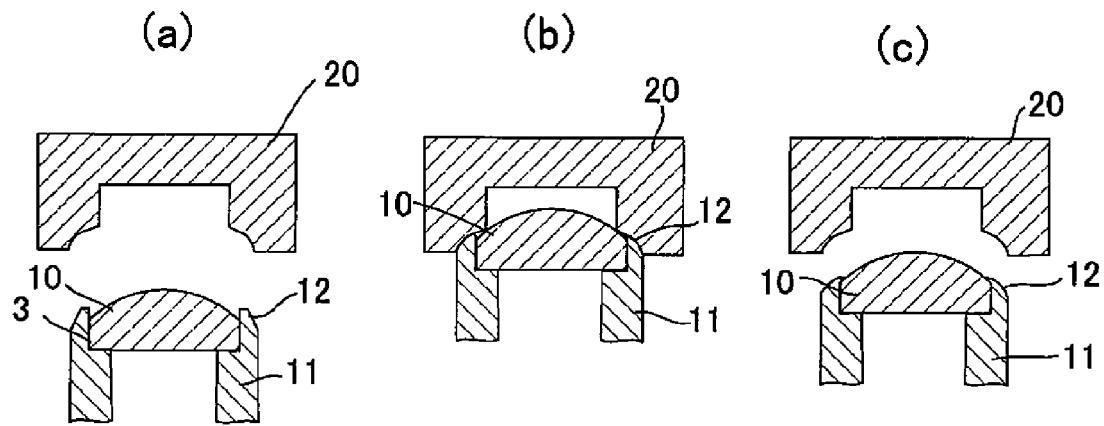
FIG. 10 are drawings showing an example existing thermal caulking processes, wherein (a) shows a state achieved before thermal caulking, (b) shows a state achieved in the course of thermal caulking, and (c) shows a state achieved after thermal caulking.
Figure 11:
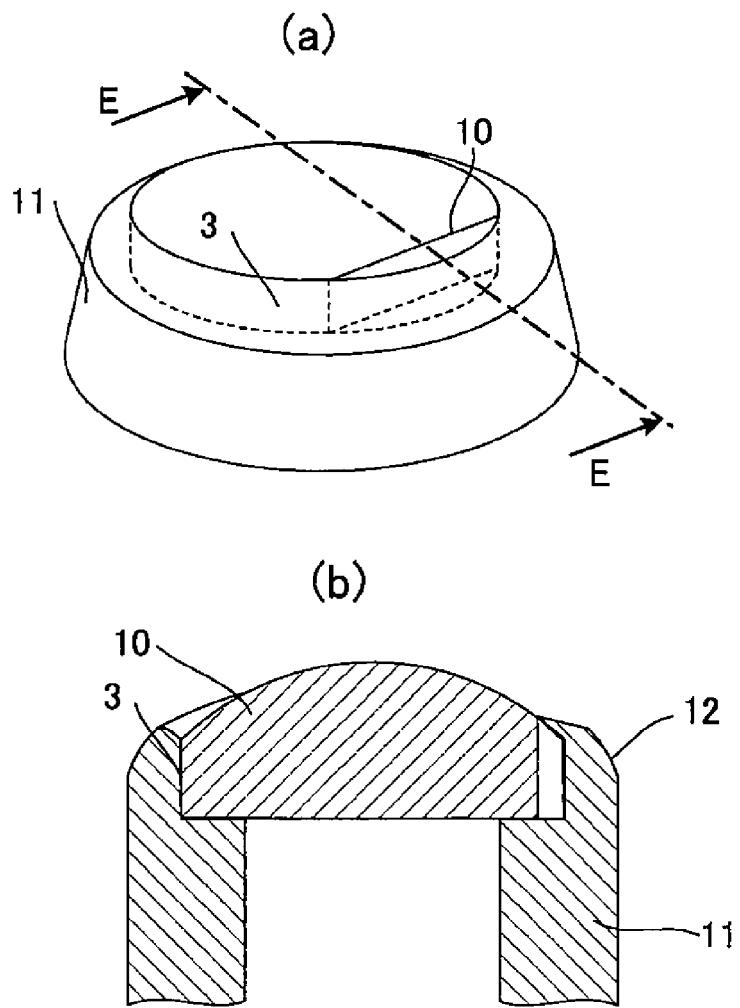
FIG. 11 are drawings showing example fitting of an existing lens assuming D-cut shape to a lens holder, wherein (a) is a perspective view and (b) is a cross sectional view.
Figure 12:
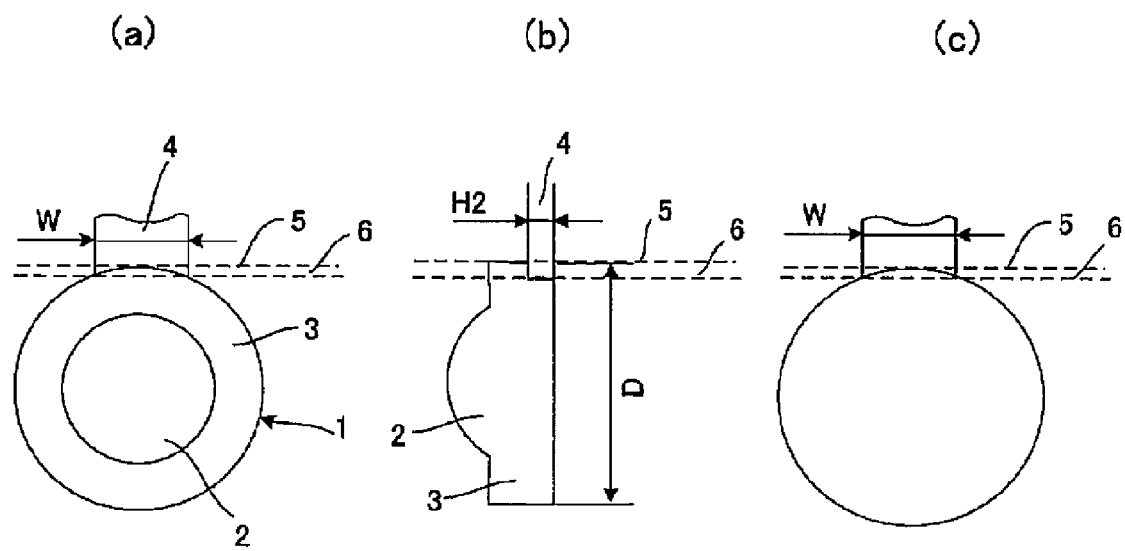
FIG. 12 are drawings showing an example existing plastic lens, wherein (a) is a front view, (b) is a right side elevation of (a), and (c) is a rear view.
Figure 13:
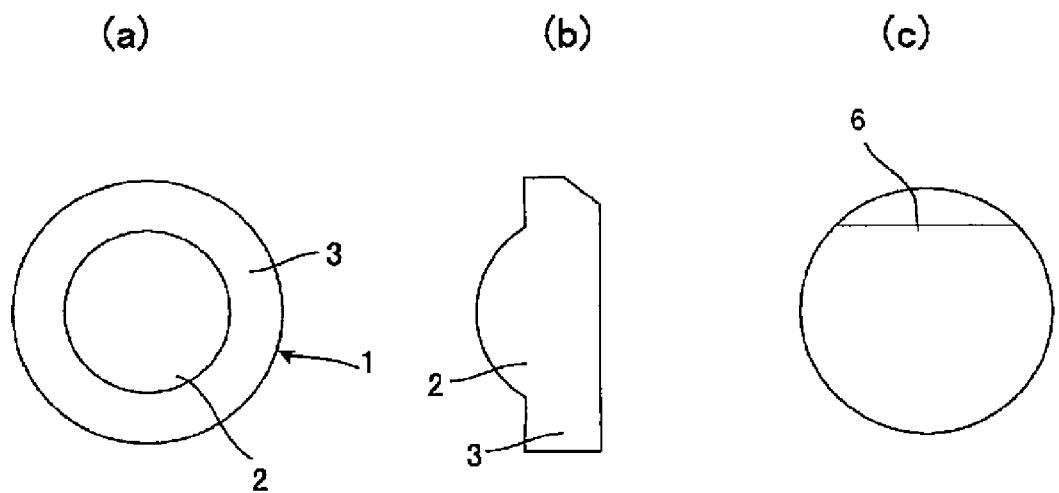
FIG. 13 are drawings showing an idealistic cut state of a plastic lens, wherein (a) is a front view, (b) is a right side elevation of (a), and (c) is a rear view.
Figure 14:
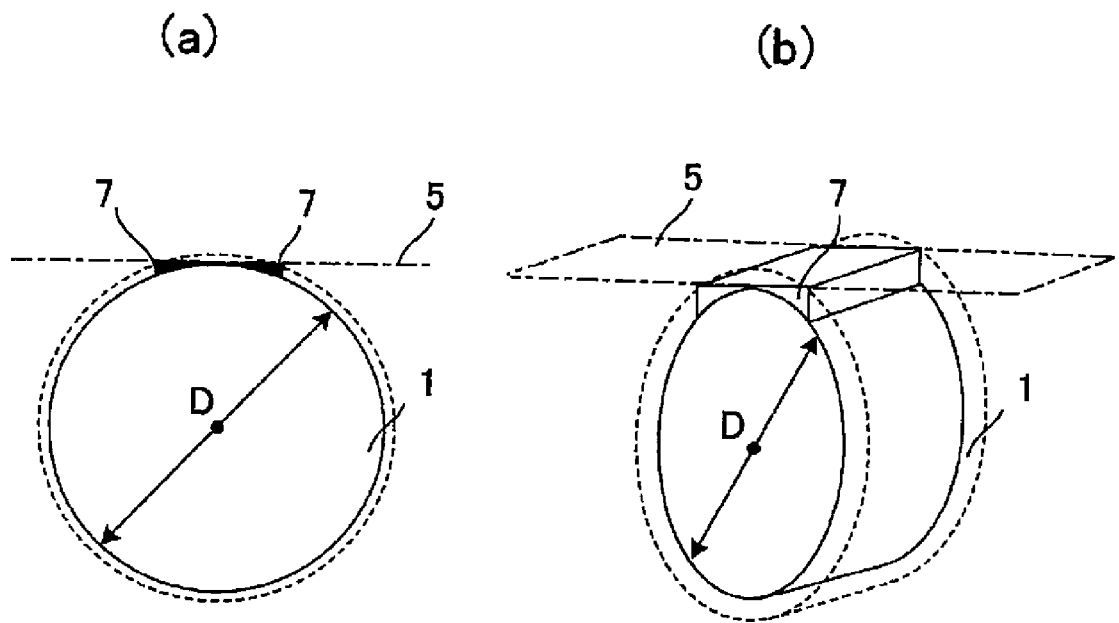
FIG. 14 are drawings showing an example existing plastic lens, wherein (a) is a front view and (b) is a perspective view.
Figure 15:
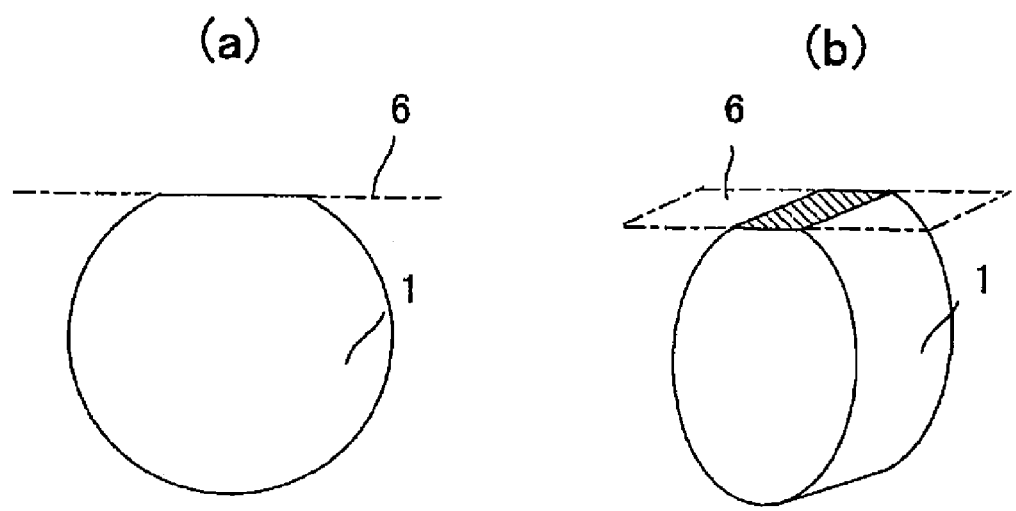
FIG. 15 are drawings showing another example existing plastic lens, wherein (a) is a front view and (b) is a perspective view.
Figure 16:
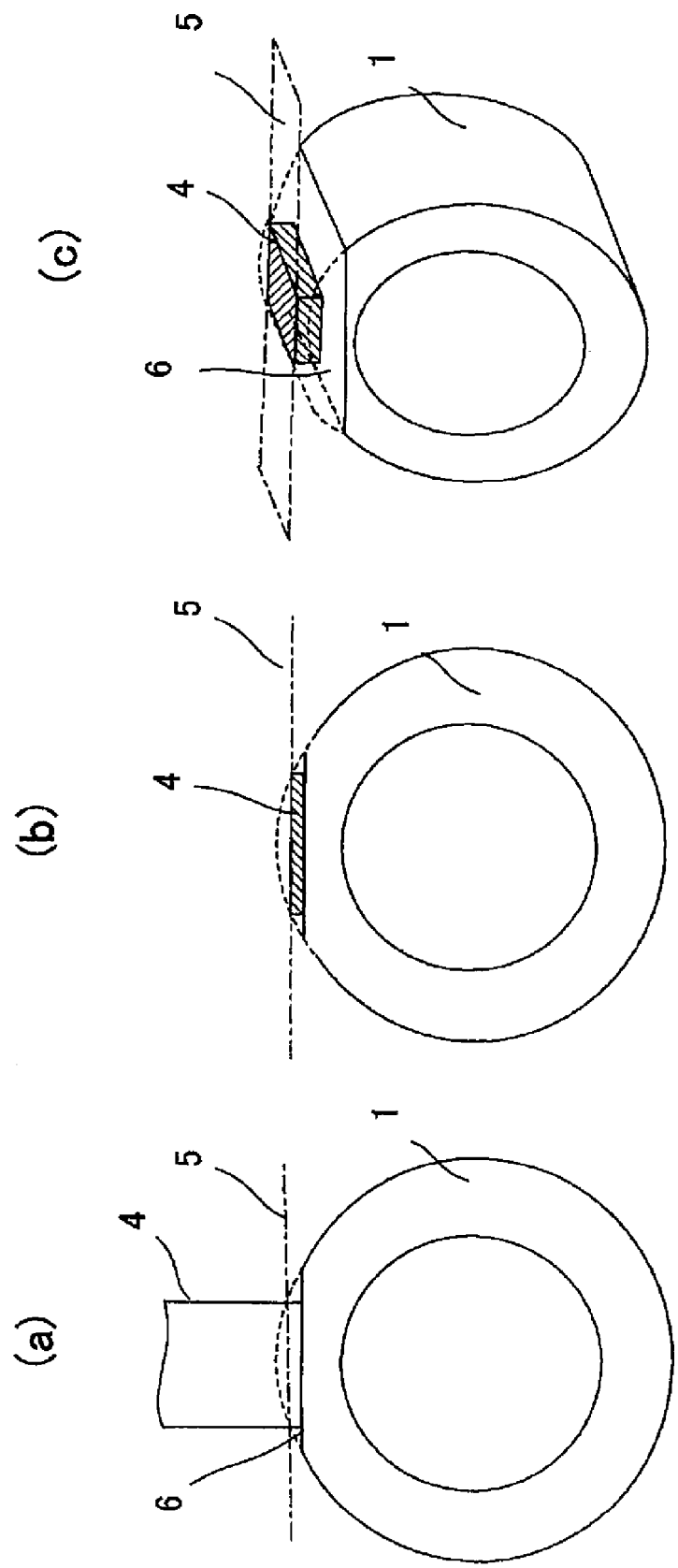
FIG. 16 are drawings showing yet another example existing plastic lens, wherein (a) is a front view, (b) is a rear view, and (c) is a perspective view.

FIGS. 1(a) to (d) are drawings showing a plastic lens of a first embodiment of the present invention, wherein (a) is a front view, (b) is a side elevation achieved in direction A shown in (a), (c) is a side elevation achieved in direction B shown in (a), and (d) is a rear view. FIG. 2 is an enlarged view of a principal part shown in FIG. 1(c). FIGS. 3(a) to (d) are drawings showing the plastic lens of the first embodiment of the present invention achieved after injection molding and before a gate is cut, wherein (a) is a front view, (b) is a side elevation achieved in direction A shown in (a), (c) is a side elevation achieved in direction B shown in (a), and (d) is a rear view. FIG. 4 is an enlarged view of a principal part shown in FIG. 3(c). FIG. 5 is a drawing showing injection molding dies. FIG. 6 is a drawing showing the plastic lens fitted into a lens holder. FIG. 7 is a drawing of an imaging device using the plastic lens.

The plastic lens of the first embodiment of the present invention is one that is manufactured by injection molding, injection compression molding, or the like, and that exhibits the following characteristics. Specifically, a projecting gate 4 formed at a portion of a circumference of a flange is cut at an angle of inclination, whereby the plastic lens has a tubular flange 3 with a circumferential surface which is of predetermined thickness or more even after cutting of the gate 4. As shown in FIGS. 1 and 2, a plastic lens 1 has a main body 2 making up an effective optical region R and an annular flange 3 formed integrally around the circumference of the main body 2. The flange 3 includes a first tubular circumferential surface 3a parallel to the optical axis "o" of the main body 2; and a second circumferential surface 3b that includes an inclined cut plane 5s for obliquely cutting the flange 3 toward a back side of the main body 2 along the direction of the optical axis "o" from the first point P on the first circumferential surface 3a and that is formed continuously from the first circumferential surface 3a.

On the occasion of use, the first circumferential surface 3a is laid along a lens holder 11 as shown in FIG. 6, whereby the plastic lens 1 is anchored by means of thermal caulking. It is desirable that a thickness H1 of the first outer circumference surface 3a be set to one-half or more of a thickness H3 of the flange 3. Since the gate 4 is cut so as not to protrude from the first circumferential surface 3a, it also exhibits a high sealing characteristic. Firm anchorage of the plastic lens thereby becomes feasible, and a sufficient sealing characteristic is also exhibited. Even when the plastic lens is used as the first surface lens to be fitted to the outermost surface, the plastic lens can also be imparted with a sufficient sealing characteristic.

When the thickness H1 of the first circumferential surface 3a is less than one-half of the thickness H3 of the flange 3, the plastic lens cannot be provided with a sufficient sealing characteristic.

Moreover, the plastic lens 1 is sealed off along with the lens holder by fitting an O-ring 14 to the flange 3, whereby a waterproof effect can be produced.

The plastic lens 1 of the embodiment has the circular main body 2 having a radius "d," and the flange 3 having a diameter D for supporting the plastic lens 1 is formed along a circumference of the main body 2.

The plastic lens 1 of the embodiment is formed by injection molding through use of dies, such as those shown in FIG. 5. A material resin is injected into a cavity made up of an upper die M1 and a lower die M2 by way of a gate Mg, whereby the plastic lens 1 is obtained. However, a resin still remaining in the gate Mg is cured at this time, whereby the gate 4 (originating from the gate Mg) is projectingly formed. Specifically, the gate 4 having a height H2 and a width W is provided on the flange 3.

On the occasion of manufacturing operation, a resin is injected by way of the gate of the dies shown in FIG. 5, and the plastic lens 1 is first formed by injection molding. In relation to the plastic lens 1 achieved at this time, there is injection-molded the plastic lens 1 including the main body 2 having the effective optical region R, the annular flange 3 formed integrally along the circumference of the main body 2, and the gate 4 that is projectingly formed on the circumference of the flange 3 due to the gate of the dies.

Of the plastic lens 1 thus injection molded, the gate 4 is cut along a cut plane that includes a point of intersection between the gate 4 and the flange 3 and that has an angle of inclination $\alpha1 \leq \theta \leq \alpha2$.

An appropriate material can be selected as a resin material from among thermoplastic resins, such as a polycarbonate resin, a methacryl resin, a cycloolefin resin, and a polyolefin resin, and thermo-setting resins, such as an epoxy resin and a silicone-based resins.

A relationship between a cut position of the gate 4 and a dimension of a cut plane is as illustrated in FIGS. 3(a) to (d) and FIG. 4. An entire length of the flange 3 is taken as H1; a point of intersection between the gate 4 and the flange 3 is taken as Q2 (Q2'); a height of the gate 4 is taken as H2; and an entire length of the flange is taken as H3. Reference numeral Q1 designates a point of intersection between the cut plane 5s of the gate 4 and the flange 3. Reference symbol δ designates a vertical distance from a straight line passing through the points Q2 and Q2' to a line parallel to an optical axis passing through the point Q1.

It is desirable that the angle of inclination θ with respect to the optical axis of the inclined surface satisfy the following expression.

$$\theta \geq \arctan((D-d)/(H1/2)) \tag{1}$$

D: Outer diameter of a flange
R: Radius of main body
H1: Entire length of flange in its thicknesswise direction On the occasion of manufacture of the plastic lens 1, a method for cutting the gate 4; namely, a method for determining the cut plane 5s, is now described.

A minimum angle α1 of a cut plane of the gate 4 for acquiring the cylindrical flange 3 having a given thickness or more can be determined from a geometrical relationship provided below. The maximum angle of the cut plane can be determined from Expression (5) provided below.

[Mathematical Expression 2]

$$\alpha 1 = \arctan\left(\frac{\delta}{(H3 - H1 - H2)}\right), \quad (2)$$

$$\left(\frac{D}{2} - \delta\right)^2 + \left(\frac{W}{2}\right)^2 = \left(\frac{D}{2}\right)^2, \quad (3)$$

$$\alpha 1 = \arctan\left(\frac{D - \sqrt{D^2 - W^2}}{2 \times (H3 - H1 - H2)}\right), \text{ and} \quad (4)$$

$$\alpha 2 = \arctan\left(\frac{D - d}{2 \times (H3 - H1)}\right). \quad (5)$$

When the angle of inclination of the cut plane 5s used for cutting the gate 4 is smaller than α1, a rib-shaped gate residue is left on the flange 3. A size of the gate residue is in excess of the inner diameter φD of a caulking portion of the lens holder. Hence, the lens cannot be fitted into the lens holder, and fixing of the lens to the lens holder cannot be implemented by the thermal caulking method.

When the angle of inclination of the cut plane used for cutting the gate 4 is larger than α2, the lens is cut, so that a problem will arise in optical performance.

Accordingly, the angle of inclination θ of the cut plane 5s used for cutting the gate 4 must fall within a range from α1≤θ≤α2 such that a circumferential flange having a given thickness can be formed when the circumferential flange 3 is cut along with the gate 4 and that optical performance and requirements for anchoring the lens and the lens holder are satisfied.

As above, the plastic lens 1 of the present invention has the circumferential flange 3 having a given thickness or more even after cutting of the gate 4. Since the circumference of the flange 3 is made to exist over its entirety, sufficient lens anchorage strength can be acquired by means of the thermal caulking technique.

Since no clearance exists between the plastic lens 1 and the lens holder 11, intrusion of dust into the lens holder can be prevented.

Moreover, the lens can be sealed off along with the lens holder by fitting the O-ring 14 to the flange 3, whereby a waterproof effect can be yielded.

As shown in FIG. 6, the thus-formed plastic lens 1 is attached to the lens holder 11. The plastic lens 1 is disposed at the outermost surface at this time, and first through third lenses 15a to 15c are disposed inside the plastic lens. The plastic lens 1 can be brought into hermetic contact with the lens holder by fitting the O-ring 14 to the flange 3.

A solid-state imaging element 30 is fitted to the thus-formed lens holder 11, whereby the imaging device, such as that shown in FIG. 7, is completed.

In relation to the thus-formed imaging device, no problem occurs in optical performance, and thermal caulking is also performed efficiently. Thus, an attempt can be made to enhance a sealing characteristic.

Second Embodiment

FIGS. 8(a) to (d) are drawings showing a plastic lens of a second embodiment of the present invention, wherein (a) is a front view, (b) is a side elevation achieved in direction A shown in (a), (c) is a side elevation achieved in direction B shown in (a), and (d) is a rear view. FIG. 2 is an enlarged view of a principal part shown in FIG. 1(c).

Likewise the plastic lens 1 of the first embodiment, the plastic lens 1 of the second embodiment is also the plastic lens 1 manufactured by injection molding, injection compression molding, or the like. Specifically, the projecting gate 4 formed at a portion of the circumference of the flange 3 is cut so as to assume an angle of inclination, whereby the plastic lens has the tubular flange 3 with a circumferential surface which is of predetermined thickness or more even after cutting of the gate 4. The angle of inclination of the cut plane 5s is milder than that described in connection with the first embodiment. However, the thermal caulking portion 12 does not have any projection and can be efficiently subjected to thermal caulking.

Third Embodiment

FIGS. 9(a) to (d) are drawings showing a plastic lens of a third embodiment of the present invention, wherein (a) is a front view, (b) is a side elevation achieved in direction A shown in (a), (c) is a side elevation achieved in direction B shown in (a), and (d) is a rear view. FIG. 2 is an enlarged view of a principal part shown in FIG. 1(c).

Likewise the plastic lens 1 of the first embodiment, the plastic lens 1 of the third embodiment is also the plastic lens 1 manufactured by injection molding, injection compression molding, or the like. Specifically, the projecting gate 4 formed at a portion of the circumference of the flange 3 is cut so as to assume an angle of inclination, whereby the plastic lens has the tubular flange with a circumferential surface which is of predetermined thickness or more even after cutting of the gate 4. The angle of inclination of the cut plane 5s is smaller than that described in connection with the first embodiment. Although slight irregularities obviously exist in the gate 4 in the embodiment, the thermal caulking portion 12 does not have any projection, so that thermal caulking can be efficiently performed.

In addition to including the gate 4, the plastic lens 1 achieved during molding also has one or a plurality of projections on the circumference of the flange 3. The projections are attributable to a puddle of resin (an air vent, or the like). The projections are sometimes provided at a plurality of locations, such as locations opposite the gate 4. Even in this case, the essential requirement is to determine a cut plane in much the same way as in the first through third embodiments and cut the projections.

Occurrence of a problem in optical performance can thereby be prevented. Further, since the thermal caulking portion of the flange does not have any projections, the plastic lens is efficiently anchored to the lens holder by means of efficient thermal caulking. A high sealing characteristic is achieved even when the plastic lens is used as the first lens of the vehicle-mounted imaging device, and high reliability is achieved.

This application is a continuation of PCT application No. PCT/JP2011/006715, which was filed on Nov. 30, 2011 based on Japanese Patent Application (No. 2011-063070) filed on Mar. 22, 2011, the contents of which are incorporated herein by reference. Also, all the references cited herein are incorporated as a whole.

As has been described above, the prevent invention enables easy anchorage of a plastic lens to a lens holder by means of thermal caulking. Hence, the lens can be applied to an imaging-system lens used particularly in a vehicle-mounted camera, a monitoring camera, a marine camera, and the like.

What is claimed is:

1. A method for manufacturing an imaging device including a plastic lens, the method including:

steps of injecting a resin by a gate of dies and injection-molding a plastic lens having a main body constituting an effective optical region, an annular flange formed integrally on an outer circumference of the main body, and a gate made up of a projection formed on a circumference of the flange from the gate of the dies, the annular flange including a tubular first circumferential surface that is parallel to an optical axis of the main body, and a tubular second circumferential surface that is parallel to the optical axis of the main body and is formed continuously from the first circumferential surface;

a cutting step of cutting the gate from the injection-molded plastic lens, together with a part of the second circumferential surface, along a cut plane including a point of intersection between the gate and the flange at an angle of inclination $0 \leq \alpha1 \leq \theta \leq \alpha2$, the angle of inclination $\theta$ being an acute angle made by the cut plane and the optical axis; and a fixing step of, after the cutting step, anchoring the plastic lens to a lens holder by means of thermal caulking, wherein, provided that an outer diameter of the flange is taken as D; that an entire length of the tubular first circumferential surface in its thicknesswise direction is taken as H1; that a height and a width of the gate for representing a size of the gate are H2 and W, respectively, that an entire length of the flange before cutting the gate achieved in a direction of an optical axis is taken as H3; that a point of intersection between the cut plane of the gate and the flange is taken as Q1; a point of intersection between the gate and the circumferential flange is taken as Q2 (Q2'); and that a vertical distance from a straight line passing through the points Q2 and Q2' to a line parallel to the optical axis passing through the point Q1 is taken as $\delta$, a minimum angle of inclination $\alpha1$ and a maximum angle of inclination $\alpha2$ for obtaining an circumferential flange having a given thickness or more are set so as to fulfill Expressions (2), (3), (4), (5) and (6) provided below:

[Mathematical Expression 1]

$$\alpha1 = \arctan\left(\frac{\delta}{(H3 - H1 - H2)}\right), \quad (2)$$

$$\left(\frac{D}{2} - \delta\right)^2 + \left(\frac{W}{2}\right)^2 = \left(\frac{D}{2}\right)^2, \quad (3)$$

$$\alpha1 = \arctan\left(\frac{D - \sqrt{D^2 - W^2}}{2 \times (H3 - H1 - H2)}\right), \quad (4)$$

$$\alpha2 = \arctan\left(\frac{D - d}{2 \times (H3 - H1)}\right), \text{ and } H1 > H3. \quad (5)$$

2. The method of claim 1, wherein after the cutting step, the second circumferential surface includes a partially tubular surface that is parallel to the optical axis of the main body and an inclined surface that obliquely cuts the flange from a first point on the first circumferential surface toward a back of the main body with respect to the direction of the optical axis.

3. The method of claim 1, wherein after the cutting step, no gate residue remains in the flange.

4. An imaging device, comprising:

a first surface lens including a plastic lens;

a group of lenses disposed inside the first surface lens;

a lens holder supporting the first surface lens and the group of lenses; and an imaging element forming an image from entrance light passing through the first surface lens and the group of lenses, wherein:

the plastic lens comprises:

a main body constituting an effective optical region; and an annular flange integrally formed on a circumference of the main body, the flange has a tubular first circumferential surface that is parallel to an optical axis of the main body, and a second circumferential surface including a partially tubular surface that is parallel to the optical axis of the main body and an inclined surface that obliquely cuts the flange from a first point on the first circumferential surface toward a back of the main body with respect to the direction of the optical axis, the tubular surface of the second circumferential surface being formed continuously from the first circumferential surface, no gate residue exists on the flange, the inclined surface is located closer to the back of the main body than a front of the main body, a thickness of the tubular first circumferential surface is one half or more of a thickness of the flange, and the lens holder and the first surface lens are anchored by means of thermal caulking.

5. The imaging device according to claim 4, wherein an angle of inclination $\theta$ of the inclined surface with respect to the optical axis satisfies the following expression (1):

$$\theta \geq \arctan((D-d)/(H1/2)) \quad (1), \text{ where:}$$

D: outer diameter of a flange, d: radius of main body, and

H1: entire length of flange in its thicknesswise direction.

6. The imaging device according to claim 4, wherein the plastic lens is manufactured by injection molding.

7. The imaging device according to claim 4, further comprising a sealing member fitted to the flange.

* * * * *